Feb. 22, 1927.
L. A. KNIGHT
1,618,443
WHEELBARROW ATTACHMENT
Filed April 1, 1926
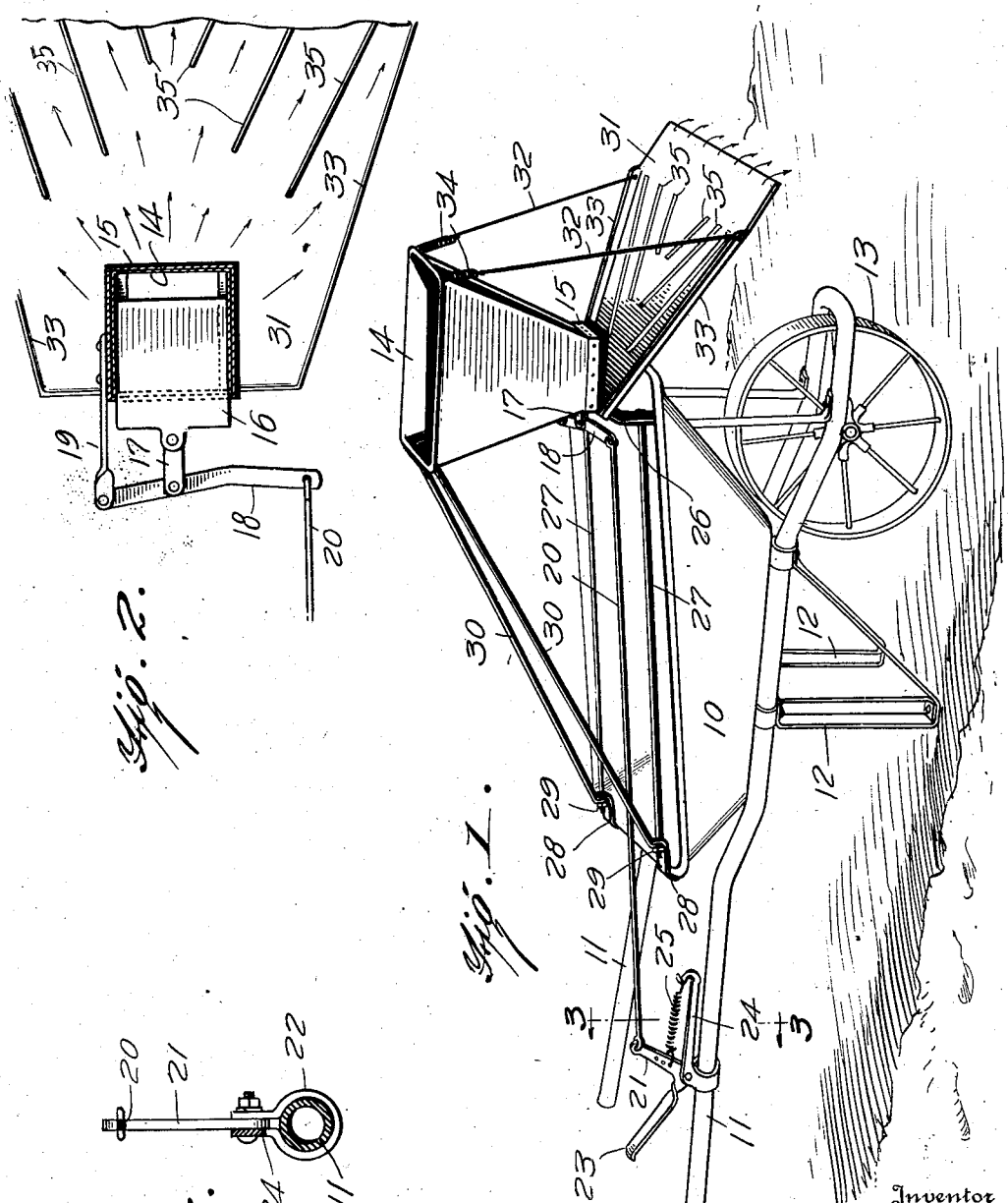
Inventor
L. A. KNIGHT,
By Townshend & Townshend
Attorneys Patented Feb. 22, 1927.

1,618,443

UNITED STATES PATENT OFFICE.

LOUIS A. KNIGHT, OF McGREGOR, IOWA.

WHEELBARROW ATTACHMENT.

Application filed April 1, 1926. Serial No. 99,061.

My invention relates to a sand distributing apparatus and has for its primary object the provision of an associated hopper distributor adapted for attachment to a wheelbarrow.

Another object of the invention is the provision in an apparatus of this character of a novel distributor plate and means for dislodging material delivered from a hopper onto the plate.

A further object of the invention is the provision of a novel wheelbarrow attachment for accomplishing the objects above described.

With these objects in view and such others as will be apparent from the description, the invention resides in the novel construction, combination and arrangement of parts hereinafter described and claimed and illustrated in the accompanying drawings of which:—

Figure 1 is an elevation of the distributor as attached to a wheelbarrow;

Figure 2 is a horizontal section through the bottom of the sand hopper just above the feed valve and illustrating the valve and distributor plate in top plan;

Figure 3 is a vertical section on the line 3—3 of Figure 1.

The present invention comprises an attachment designed for ready application to a conventional hand barrow whereby the barrow may be employed as a vehicle for the even distribution of sand or other granular material over the ground in the path of travel of the barrow. The invention is shown as applied to a conventional barrow 10 having the usual rearwardly extending handles 11, rests 12 and bearing wheel 13. The apparatus comprises a hopper 14 for containing sand or other granular material, and which is open at the top and constricted at its lower end or bottom 15. Delivery of material from the hopper is controlled by a horizontally slidable gate valve plate 16 working across the hopper outlet and controlled by a link 17 pivotally connected at its opposite ends between the plate 16 and an actuating lever 18, which lever is pivoted at one end to a bracket bar 19 rigidly secured to the hopper and extending rearwardly therefrom. A rod 20 connects the free end of the lever 18 with the short arm 21 of a bell crank lever which is pivotally mounted in a bracket 22 adapted to be clamped around one of the handle bars 11 of the barrow. The long arm 23 of the bell crank lever is fashioned as a depressible handle whereby upon depression against the handle bar 11 the pull rod 20 is actuated to move the lever 18 thus opening the valve plate 16 permitting delivery of sand from the hopper. An integral extension 24 carried by the bracket 22 forms an anchor for a coiled contraction spring 25 which is connected to the short arm 21 of the bell crank lever, the spring acting to maintain the valve plate 16 in closed position.

The hopper 14 is mounted over the front end of the barrow being supported at the top of a substantially U-shaped frame 26 which is formed to be positioned within the barrow being braced and retained in position by a pair of rearwardly extending brace rods 27 which extend to the rear of the barrow. The ends of the brace rods 27 are threaded for extension through a portion of the hook members 28 formed for engagement over the upper edge of the rear of the barrow. Nuts 29 serve to fasten the rods in position and also to clamp against a pair of inclined brace rods 30 which extend upwardly for engagement with the top of the hopper whereby the hopper is rigidly anchored in position relative to the barrow.

A sand distributor in the form of a flared dispersing plate 31 is hinged at its constricted rear end to the bottom 15 of the hopper and the forward portion of the plate is connected by means of rods 32 pivotally attached at their lower ends to the side flanges 33 of the distributor plate and secured at their upper end to coiled springs 34 attached to the upper edge of the hopper. Intermediate its ends the plate 31 is provided with a series of angled guide ridges 35 which act to distribute sand evenly over the plate for a uniform delivery in front of the barrow.

In operation the hopper may be filled from a reserve supply of sand or other material carried in the body of the barrow and as the barrow is moved forward the handle lever 23 is depressed to open the valve plate 16 to the desired degree permitting delivery of sand onto the downwardly inclined plate 31. The bounding or jarring movement of the barrow will cause the plate 31 to joggle up and down which action is increased through the spring supports 34. This movement of the plate effectively serves to prevent any accumulation of material on the plate and acts to distribute the sand evenly between the guide ridges 35 so that a continuous even flow of material is maintained at the forward edge of the distributor plate. A release of the pressure on the handle 23 allows the spring 25 to act for closing the delivery valve. The entire assembly may be dismantled simply by loosening the nuts 29 to permit disengagement of the hooks 28, and dismounting the bracket 22 whereby the entire distributing apparatus may be lifted as a unit from the barrow.

While in this preferred embodiment certain details of structure have been illustrated and described, it is to be understood that the invention is not to be limited thereby but that any desired changes and modifications may be made therein as will fall within the scope of the invention as claimed.

I claim:—

1. A wheelbarrow attachment, comprising a frame formed for engagement in a barrow, brace rods secured to said frame, means on said rods for attaching engagement with an edge of a barrow, a hopper mounted on said frame, means for controlling delivery of material from said hopper, and a distributor plate hinged to said hopper over the front of said frame for extension forwardly of a barrow.

2. A wheelbarrow attachment, comprising a frame formed for seating engagement in a barrow, brace rods secured on said frame, attaching means carried by said rods for engaging an edge of a barrow, a hopper carried by said frame, means for manual control of material delivery from said hopper, brace rods for said hopper, a downwardly inclined distributor plate pivoted to said hopper beneath the bottom thereof, said plate having a flared portion, and means resiliently suspending the flared portion of the plate from the body of the hopper.

3. A wheelbarrow attachment, comprising a frame formed for seating engagement in a barrow, brace rods extending from said frame, means carried by said rods for clamping engagement over the rear edge of a barrow, a hopper carried by said frame, means for control of material delivery from said hopper, inclined brace rods extending between the top of said hopper and said first named brace rods, and a distributor plate hinged to said hopper forwardly of said frame for extension forwardly of a barrow.

In testimony whereof I have affixed my signature.

LOUIS A. KNIGHT.